UNITED STATES PATENT OFFICE.

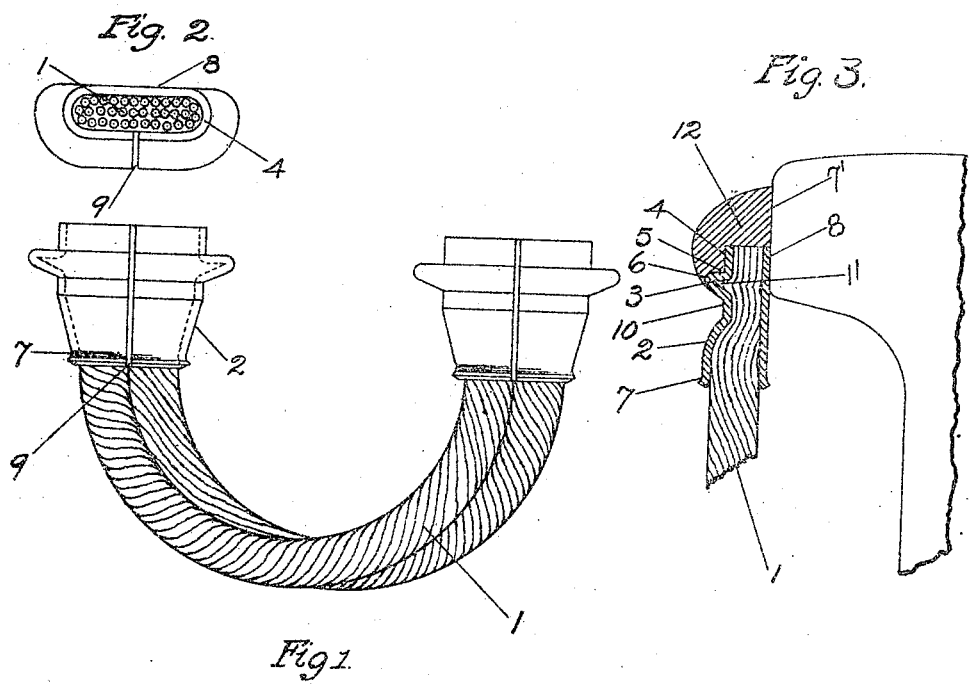

FRANK O. HARTMAN, OF MANSFIELD, OHIO, ASSIGNOR TO THE HARTMAN ELECTRICAL MANUFACTURING COMPANY, OF MANSFIELD, OHIO, A CORPORATION OF OHIO.

RAIL-BOND.

1,215,933.      Specification of Letters Patent.      Patented Feb. 13, 1917.

Application filed April 17, 1916. Serial No. 91,573.

*To all whom it may concern:*

Be it known that I, FRANK O. HARTMAN, a citizen of the United States of America, residing at Mansfield, in the county of Richland and State of Ohio, have invented certain new and useful Improvements in Rail-Bonds, of which the following is a specification.

This invention relates to rail bonds of the type designed for welding to the side surface of the rail tread, through the medium of a filling metal, by the oxyacetylene or other gas flame process.

The primary object of my invention is to provide a rail bond having a split sleeve made of sheet metal (iron or steel) for incasing the end of the flexible body portion of the bond and so formed as to provide a hollow ledge to catch, retain and support the fused filling metal as it is flowed on in the process of welding and also to provide means of securely attaching or locking said sleeve to said flexible member through the medium of said hollow ledge.

A further object of my invention is to provide a sleeve which is adapted to be securely attached to the end of said flexible body portion and to prevent the same from being heated excessively during the welding process, except at its extreme end, thereby obviating all danger of burning or melting the metal composing said flexible member.

A further object is to provide a sleeve incasing the flexible member to a predetermined point from the end, leaving the end exposed, and providing means of holding or retaining, during the process of welding the fused filling metal so that it can be built on said exposed end and in overlapping relation to the said sleeve.

Another feature of the invention consists in providing a split sleeve which can be firmly clasped or clamped to the flexible member to afford facilities to assist in the operation of welding the bond to the rail, but which will, when the bond is subjected to leverage or pressure, yield or spread apart, thereby partially relieving the leverage or pressure exerted on the bond, making it more difficult to remove or separate from the rail than a bond constructed in the conventional manner without such split sleeve.

A further object of this invention is to construct a sleeve that will provide means of building up and welding a larger cross-section of filling metal to the end of the bond, than the cross-section of said end, thereby insuring a greater and more efficient mechanical and electrical connection between the parts than is accomplished in welding to a rail a bond without the aid of the novel sleeve shown and described herein.

I attain these and other objects by the mechanism illustrated in the accompanying drawing in which:

Figure 1 is a front elevation of the bond with the sleeves attached thereto.

Fig. 2 is a plan view of the end of the bond.

Fig. 3 is a vertical sectional view of the invention, showing the bond and the interposed filling metal welded to the bond and rail.

In the drawing, reference numeral 1 represents the flexible body portion of the bond, preferably made of a plurality of stranded wires. A split sleeve 2 having a hollow ledge 3, is provided and is adapted to fit or to be formed around said flexible member, one end of the sleeve being preferably arranged flush with the end of said flexible member. The sleeve is reduced at one end to form a collar 4 and a shoulder 5 in connection with the face 6 of the ledge 3 and the other end is flared at the end 7 in order that the sleeve will not present at this point a sharp edge to said flexible member at its point of emergence. A blank is provided and first partially formed, the end of the flexible member is then inserted therein and pressure of sufficient force is exerted on the sleeve on both sides of the ledge 3 so as to flatten it at the points 4 and 10 and at the same time to upset or kink the flexible member as shown at 11 into engagement with the recess or groove of the ledge 3, thereby securely fastening or locking the flexible member to the sleeve 2. In installing the bond the flattened surface 8 is placed against the side surface of the rail tread. The slit 9 of the sleeve 2 is located opposite the flattened surface 8 and is both centrally and longitudinally positioned with respect to the incased portion of the flexible member.

The process of welding the bond will now be described.

The bond is first positioned on the side of the rail tread at a predetermined point, and a gaseous flame, preferably oxy-acetylene, is directed against the rail and end of the bond until both are heated to a welding temperature. A rod of filling metal, possessing the desired electrical and mechanical qualities is inserted in or subjected to the flame and is gradually fused, the molten metal is thereby welded to the side surface of the rail tread and the end of the bond, and formed in overlapping relation to the sleeve as shown in Fig. 3.

It will be observed that in the absence of the ledge 3 the weld would be only to the end surface of the bond. Such a weld would have far less mechanical strength than one in which the filling metal overlaps such end, thereby not only securing a good weld to the end of the flexible member, but to the incasing sleeve as well. Attention is called to the fact that with the use of a sleeve formed with a ledge, a working table is provided on which to build up a greater cross-section of filling metal, and therefore a better electrical and mechanical connection, than could be secured without such ledge.

It will further be noted that in the event of anyone attempting to separate or remove the bond from the rail by manipulating a bar to engage the loop body portion of the bond, using the rail as a fulcrum, bringing leverage or pressure to bear on the bond to separate it from the rail, will cause the sleeve to yield and open at the slit 9 and thus reduce the leverage exerted on the bond at the point of weld.

The use of a sleeve constructed as described, not only permits of a good mechanical and electrical connection to the ends of the wires of the flexible member, but shields said wires from the direct flame and thus prevents the burning or melting of the same, except at the ends, and they thereby retain their original toughness and strength.

As both ends of the flexible member are equipped with sleeves of duplicate construction and the method employed in welding and uniting both ends of the bond to abutting rails or the like is precisely the same, the specification is drawn in the singular number to avoid repetition.

While in the drawing and descriptive matter I have shown a standard wire cable, my invention is not limited to this particular form of conductor, as by slight variation in the form of the sleeve the same can be adapted for a ribbon or other well known form of conductor. I have shown the preferable form of construction and method of using the invention, but I do not desire to be limited to the details as shown and described, as immaterial alterations and changes can be made without departing from the spirit of this invention.

I claim:

1. An article of manufacture consisting of a rail bond having a sleeve fastened to the end thereof and having external means forming a ledge provided on said sleeve adjacent but not at the end to the end of the bond which is adapted to catch, support and retain the filling metal used in making the weld, so that the area of said filling metal can be enlarged and built in overlapping relation to said sleeve and welded to the end of the bond.

2. A rail bond, adapted for welding to the rail by oxy-acetylene or other gaseous flame process, and consisting of a flexible body portion incased by a sleeve adjacent to its end, said sleeve being provided with an external ledge adapted to catch, retain and support the fused filling metal used in making the weld so that said filling metal can be built up with an enlarged section and welded to the end of the bond in overlapping relation thereto.

3. In a rail bond adapted for welding to the rail by the oxy-acetylene or other gaseous flame process, and consisting of a flexible body portion incased by a sleeve at the end thereof, external means provided on said sleeve which is adapted to catch, retain and support the fused filling metal used in making the weld during the welding process so that said filling metal can be built up against the surface of the rail in overlapping relation to said sleeve and welded to the end of the bond, and means provided in the sleeve to lock said flexible body portion to said sleeve.

4. In a bond, in combination with a rail, a sleeve having an external hollow ledge, a flared portion and a reduced collar formed on the sleeve contiguous with the ledge, said hollow ledge being adapted to engage the flexible member of the bond when pressure is exerted on the sleeve to kink said flexible member and a filling metal adapted to weld the bond and the rail together as described.

5. In a bond, in combination with a rail, a sleeve having an external hollow ledge, a flared portion, and a reduced collar formed on the sleeve contiguous with the ledge; said hollow ledge being adapted to engage the flexible member of the bond when pressure is exerted on the sleeve to kink the same, a filling metal adapted to be fused and welded to the bond and rail, the ledge also being adapted to catch, support and retain the filling metal when being fused and permit it to form in overlapping relation to the sleeve.

6. In a rail bond comprising a flexible body portion, a metal sleeve to inclose the body portion adjacent to the end thereof; said sleeve being provided with a hollow projecting rib adjacent to said end, the opposite end being flared as described.

7. In a rail bond comprising a flexible body portion, a split metal sleeve to inclose the body portion adjacent to the end thereof and provided with an external projecting ledge adjacent to its end, the opposite end being flared as described.

8. In a rail bond designed for welding to the side surface of a rail tread in combination with fused filling material, a flexible body portion, a metal split sleeve to inclose the body portion adjacent to the end thereof the sleeve also being provided with hollow external means to catch the fused filling material and to permit of kinking the bond into engagement with the inside of the external means; said sleeve being arranged upon the bond to expose the slit in central longitudinal relation to the inclosed portion of the bond said bond having a flared end.

9. In a rail bond, a sleeve formed at one end to provide a ledge contiguous with a reduced portion, whereby a shouldered portion is formed, the opposite end of said sleeve being provided with a tapered mouth, the hollow portion of said ledge being adapted to receive and inclose the kinked upset portion of the bond when the sleeve is subjected to pressure at predetermined points without affecting said mouth portion; said ledge also being adapted to catch and retain the filling metal when being fused and permit it to form in overlapping relation to the sleeve and weld the end of the bond and rail together, as described and set forth.

10. An article of manufacture consisting of a rail bond having a flexible body portion incased by a sleeve adjacent the end thereof, external means provided on said sleeve adapted to catch, support and retain the filling metal used in making the weld, so that said filling metal can be built up on the exposed end of said flexible body portion of the bonds in overlapping relation thereto and be welded to the bond and rail.

11. In a rail bond adapted for welding to the rail by oxy-acetylene or other gaseous flame process, and consisting of a flexible body portion incased by a sleeve adjacent and flush with the end thereof, external means provided on said sleeve which is adapted to catch, support and retain the fused filling metal used in making the weld during the welding process so that said filling metal can be built up on the exposed end of said flexible body portion and in overlapping relation thereto.

In testimony whereof I affix my signature.

FRANK O. HARTMAN.